United States Patent [19]

Rutledge et al.

[11] 4,221,836
[45] Sep. 9, 1980

[54] COEXTRUDED PLASTIC SHEETING

[75] Inventors: Raleigh N. Rutledge; Bob J. Cruson, both of Big Spring, Tex.

[73] Assignee: Cosden Technology, Inc., Big Spring, Tex.

[21] Appl. No.: 854,329

[22] Filed: Nov. 23, 1977

[51] Int. Cl.$^2$ .................................................. B32B 25/08
[52] U.S. Cl. ........................................ 428/220; 264/171; 428/500; 428/515; 428/519
[58] Field of Search .................... 264/171, 173, 40.1, 264/40.7; 428/500, 515, 519, 220

[56] References Cited

U.S. PATENT DOCUMENTS

| | | | |
|---|---|---|---|
| 3,589,976 | 6/1971 | Erb | 428/515 |
| 3,833,704 | 9/1974 | Nissel | 264/171 |
| 3,968,196 | 7/1976 | Wiley | 264/171 |
| 3,993,810 | 11/1976 | Bonis | 264/171 |
| 4,100,237 | 7/1978 | Wiley | 428/515 |

*Primary Examiner*—Jeffery R. Thurlow
*Attorney, Agent, or Firm*—Schwartz, Jeffery, Schwaab, Mack, Blumenthal & Koch

[57] ABSTRACT

Disclosed is a method for the manufacture of coextruded plastic sheeting from normally incompatible, i.e. difficultly bondable, polymers and the composite sheeting produced thereby. A composite plastic sheeting of a solid hydrocarbon polymer and an ABS polymer normally incompatible therewith is formed by coextruding the hydrocarbon and incompatible ABS polymer with an intermediate layer interposed therebetween of an ABS polymer having a bonding factor and a melt viscosity between each of the hydrocarbon and incompatible ABS polymers which renders the intermediate layer ABS polymer strongly adherable to each adjoining polymer.

15 Claims, No Drawings

COEXTRUDED PLASTIC SHEETING

BACKGROUND OF THE INVENTION

The present invention relates to the production of co-extruded multiple-layered sheeting or film from chemically and/or physically different polymeric materials which have hitherto been found extremely difficult to unite by conventional extrusion techniques. More particularly, the present invention relates to the production of a composite co-extruded sheeting or film of normally difficultly bondable solid hydrocarbon polymers and ABS polymers which possess excellent peel strengths between each layer.

Many attempts have been made to produce a thermoplastic sheeting or film which combines the desirable characteristics of several polymeric materials. Due to the highly attractive economic characteristics of solid hydrocarbon polymers and the highly desirable surface properties of ABS polymers, the prior art has particularly sought to produce a sheeting or film which combines the desirable properties of each of these polymers. Heretofore, however, the prior art has been unable to achieve a sheeting or film of solid hydrocarbon polymers and ABS polymers which possess a satisfactory quality and peel strength. One method by which the prior art has sought to prepare a sheeting or film from these two types of polymeric materials has involved the blending of the ABS polymer and the solid hydrocarbon polymer. This technique has not been entirely successful, however, since the properties of each material are usually altered to an undesirable degree as a result of the blending. Additionally, the physical and chemical incompatibility of the ABS and solid hydrocarbon polymers has prevented the preparation of a satisfactory product.

In another technique, preformed layers of each polymer are adhered together by interposing an adhesive between each preformed layer of polymer. Here again, however, the relative incompatibility of the solid hydrocarbon polymers and the ABS polymers has resulted in a composite sheeting or film with less than desirable physical properties. Moreover, this technique requires a plurality of steps involving molding each polymer layer, applying a suitable adhesive thereto, superimposing the adhesive coated polymer layers upon one another, and then pressing the sheets into a unitary, composite material. Additionally, in order to produce acceptably thin composites in this manner, very thin polymer layers must be utilized which are extremely difficult to work with. For example, in Japanese Kokai 74-39,656, separate sheets of high impact polystyrene and ABS polymers are first extrusion molded. A butadiene-styrene block copolymer is then utilized as an adhesive to prepare a laminate from the preformed extrusion molded sheets. In a variation of this technique, U.S. Pat. No. 3,809,602 describes the preparation of a composite sheeting of ABS polymer and polyvinylidene chloride. In the method of this patent, a preformed sheet of ABS polymer is coated with a layer of adhesive. After drying, an emulsion of the polyvinylidene chloride polymer is then applied to the adhesive side of the ABS sheet. Another drying step is thereafter required to complete the composite sheet.

Polymer composites of ABS and solid hydrocarbon polymers have also been sought to be prepared by co-extrusion. Very little success, however, has been recorded in the area of co-extrusion of multiple thermoplastic layers merely laminated on top of one another. It is well known in the art that solid hydrocarbon polymers and ABS polymers exhibit a poor adhesion with each other. Polystyrene polymers and ABS polymers of 20% or more acrylonitrile content are particularly known to exhibit poor adhesion to each other. Prior attempts aimed at coextrusion of these polymeric materials have resulted in multiple-layered products wherein the individual layers are rather easily peeled from one another, and like attempts to laminate materials of this nature by extruding a molten layer of one polymer onto a preformed sheet of a second polymer have provided similar unsatisfactory results. One exception to the general inability of the prior art to manufacture composite products of solid hydrocarbon and ABS polymers is described in U.S. Patent Application Ser. No. 752,619, now U.S. Pat. No. 4,100,237. This application describes a particularly efficacious method for the co-extrusion of a multiple-layered sheeting of ABS polymer and polystyrene. However, the method of this application is limited to a two-layer structure in which the ABS polymer has a specific range of permissible acrylonitrile content.

Accordingly, there exists a great need in the art for a multiple-layered sheeting or film which combines the desirable properties of a wide variety of ABS and solid hydrocarbon polymers, and which at the same time exhibits a satisfactory peel strength between each layer.

SUMMARY OF THE INVENTION

Accordingly, it is an object of the instant invention to provide a method for the production of co-extruded composite sheeting or film from two or more normally incompatible, i.e., difficultly bondable, polymeric materials.

It is an additional object of the present invention to provide a method for the production of a multiple-layered sheeting having a base layer of a relatively inexpensive polymeric material and a surface layer of a polymeric material which possesses highly desirable surface characteristics.

A further object of the instant invention is the provision of a method for the production of a co-extruded multiple-layered sheeting or film of a solid hydrocarbon polymer and an ABS polymer, which successfully combines the desirable characteristics of each polymer, and which exhibits a high peel strength between each layer.

A specific object of the instant invention resides in the production of a co-extruded multiple-layered sheet having a base layer of polystyrene and a surface layer of ABS polymer having a wide range of acrylonitrile content.

A particular object of the present invention is the provision of a composite co-extruded sheeting or film having a base layer of a polystyrene polymer and a surface layer of an ABS polymer with a high acrylonitrile content.

Yet another object of the present invention is the provision of a co-extruded multiple-layered sheet which is suitable for use in the manufacture of plastic containers.

An additional object of the instant invention resides in the provision of a co-extruded composite sheet of solid hydrocarbon and ABS polymers which is suitable for use in the manufacture of plastic containers.

In accomplishing the foregoing and other objects, there has been provided in accordance with the present invention a process for the manufacture of a co-extruded laminated plastic sheeting from a solid hydrocarbon polymer and an ABS polymer normally incompatible therewith. This process comprises co-extruding the solid hydrocarbon polymer and the normally incompatible ABS polymer in an extrusion die with an intermediate layer therebetween of an ABS polymer having a bonding factor with the solid hydrocarbon polymer ($BF_{C1}$) of between 0.9 and 1.15, wherein the bonding factor $BF_{C1}$ is defined by:

$$BF_{C1} = \frac{A(15.4) + B(8.6) + S(9.1)}{\delta_1}$$

wherein A, B, and S are the respective weight percentages of acrylonitrile, butadiene, and styrene in the intermediate ABS polymer, $\delta_1$ is the Hildebrand solubility parameter for the solid hydrocarbon polymer, and A is less than about 0.4 S, and a bonding factor with the normally incompatible ABS polymer ($BF_{C2}$) of between 0.9 and 1.15, wherein the bonding factor $BF_{C2}$ is defined by:

$$BF_{C2} = \frac{A_2(15.4) + B_2(8.6) + S_2(9.1)}{BF_{C1} \delta_1}$$

wherein $A_2$, $B_2$, and $S_2$ are the respective weight percentages of acrylonitrile, butadiene, and styrene in the normally incompatible ABS polymer, and $BF_{C1}$ and $\delta_1$ are defined as above; additionally, in order to form a firm bond between each of the adjoining polymers, the intermediate layer ABS polymer must possess a melt viscosity under extrusion conditions between about 50 to 150 percent of the melt viscosity of both the solid hydrocarbon polymer and the normally incompatible ABS polymer.

Applicants have found that solid hydrocarbon polymers may be firmly bonded to normally difficultly bondable ABS polymers of diverse acrylonitrile content simply by co-extruding therebetween an intermediate layer of ABS polymer which has a ratio of acrylonitrile content to styrene content of less than about 0.4, and which has a bonding factor and a melt viscosity between each of the solid hydrocarbon and ABS polymers which renders the intermediate layer ABS polymer strongly adherable to each adjoining polymer. Accordingly, by selecting an ABS polymer for the intermediate layer which satisfies the above criteria, a composite plastic sheeting or film from even highly incompatible polymeric materials may be prepared with excellent results. While the principles of the instant invention are highly advantageous for the preparation of co-extruded plastic composites with a wide variety of solid hydrocarbon polymers, it is particularly efficacious in the preparation of polystyrene and ABS polymer co-extruded composites. In the preferred embodiment, therefore, the instant invention thus provides co-extruded thermoplastic composites having a base layer of polystyrene polymer, an intermediate layer of an ABS polymer satisfying the above criteria, and an outer layer of a normally incompatible ABS polymer.

In a second embodiment, the principles of the instant invention are further utilized to provide a co-extruded composite material which is suitable for use in the manufacture of plastic containers, and particularly for use in the manufacture of plastic containers intended for food and beverages, which combines the desirably low permeability to oxygen and water vapor of acrylonitrile polymers while eliminating the possibility of acrylonitrile migration into the contents of the container. This co-extruded plastic composite comprises a base layer of a solid, relatively inert polymer free of acrylonitrile units which functions as a barrier to possible migration of free acrylonitrile into the contents of the plastic container, an intermediate layer of an ABS polymer and an outer layer of an ABS polymer, all three layers having the above-recited relationship of bonding factors.

Other objects, features, and advantages of the instant invention will become apparent to the skilled artisan upon examination of the following detailed description of the present invention.

DETAILED DESCRIPTION OF THE PREFERRED EMBODIMENTS

The present invention provides a process for the simple co-extrusion of multiple-layered composites of normally incompatible polymers, and particularly, of solid hydrocarbon polymers and ABS polymers, which in contradistinction to prior art composites, possess an excellent peel strength and a desirable balance of physical properties. As used herein, the term "ABS polmer" refers broadly to that class of graft polymers well known to those skilled in the art containing acrylonitrile, butadiene, and styrene monomers. A multitude of such ABS products are available commercially, and the present invention contemplates that the outer-layer ABS polymer may comprise any ABS polymer known to those skilled in the art, and may include both homogeneous ABS polymers and physical blends of two or more ABS polymers. As further used herein, the term "normally incompatible ABS polymer" refers to those ABS polymers or blends which are normally incompatible with the solid hydrocarbon polymer. Suitable ABS resins for use as the intermediate layer of the co-extruded composites of the instant invention may easily be ascertained by one of ordinary skill in the art from molecular weight, melt index, and/or melt viscosity data characterizing any given resin, together with a calculation of the bonding factor with respect to the solid hydrocarbon polymer chosen for the substrate layer as will become more apparent hereinafter. As also used herein, the term "co-extruded composite" refers to co-extruded laminated sheeting or films, having two or more distinct polymer layers.

The solid, hydrocarbon polymers suitable for use in the composites of the instant invention include any solid, relatively inert polymer which is well known to those skilled in the art. By way of example, but not of limitation, suitable solid, hydrocarbon polymers include polystyrene polymers, polyolefin polymers, such as polyethylene or polypropylene, polyvinyl acetate, polyphenylene oxide polymers, polyvinyl chloride, polyvinylidene chloride, and polymers and copolymers of butadiene. While the present invention is suitable for use in the preparation of co-extruded composites containing a wide variety of solid hydrocarbon polymers, it is particularly advantageous for use in the preparation of co-extruded composites containing polystyrene. Accordingly, the inventive concepts of the present invention will be described with reference to the preparation of co-extruded composites of polystyrene and normally incompatible ABS polymers, although it is to be emphasized that the instant invention contemplates a broad method whereby composites of a wide variety of solid hydrocarbon polymers may be adhered with incompatible ABS polymers.

As further employed herein, the term "polystyrene" includes both homopolymers of styrene and copolymers of styrene with other polymerizable and polymerized monomers. Included within the latter category are impact polystyrenes which comprise graft copolymers of styrene upon conjugated diene backbone polymers such as polybutadiene, butadiene-styrene copolymers, butadiene-acrylonitrile copolymers, natural rubber, etc. Likewise included in this category are normal copolymers of styrene with minor amounts of other well known, conventional monomers. Particularly preferred for use in the composites of the instant invention are homopolystyrene, and impact polystyrene. In the preferred embodiment, the present invention thus contemplated the provision of a co-extruded composite sheeting or film having the desirable economic characteristics of polystyrene and concurrently possessing the highly desirable surface properties, such as low permeability to oxygen and water vapor, and chemical resistance of ABS polymers. Such stock material characterized by a chemically resistent surface layer of ABS is well suited for fabrication of refrigerator door liners, and food and beverage containers, such as margarine tubs, as will become apparent hereinafter.

The essence of the instant invention resides in applicant's discovery that solid hydrocarbon polymers, and particularly polystyrene polymers, and ABS polymers normally highly incompatible therewith can be co-extruded to produce a multiple-layered composite which exhibits excellent peel strength by co-extruding an intermediate layer of an ABS polymer which satisfies several important criteria between the polystyrene and incompatible ABS polymer layers. In order for the intermediate layer ABS polymer to strongly adhere together the polystyrene polymer layer and the incompatible ABS polymer layer, the melt viscosities of each polymer must be relatively approximate to each other. Alternatively, the intermediate layer ABS polymer must have a melt viscosity which may be adjusted, as for example, by sufficiently raising the temperature of the polymer during processing, to a value approximating the melt viscosities of the polystyrene and incompatible ABS polymer. In order to facilitate this matching of melt viscosities, the melt viscosity of the incompatible ABS polymer may also be adjusted by heating.

Although it is not possible to put precise limits on the degree of similarity required between the respective melt viscosities of the polymeric materials, and although there will perhaps be some degree of unpredictability between particular polymers falling within any broad characterization, in general, satisfactory results are achieved in accordance with the instant invention if the melt viscosity of the intermediate layer ABS polymer is within the range of about 50 to 150% of that exhibited by the polystyrene and incompatible ABS polymers. These relative values are only important under actual co-extrusion conditions since in most instances, each of the ABS polymers employed herein which differ from polystyrene in melt viscosity under standard test conditions by more than the above range can be modified under processing conditions to adjust the melt viscosity into suitable proximity to that of the polystyrene component. To illustrate the relationship between relative melt viscosity and adherence, the adherence of two typical ABS polymers to a representative polystyrene polymer was measured:

| Polymers | Melt Viscosity Values | | Adherence |
|---|---|---|---|
| | Melt Flow Rate By Extrusion Plasto-Meter (A.S.T.M. D-1238-73T) Condition G (Gms./10 minutes) | Brabender Torque (10 min.) Meter-Grams | |
| 1. ABS - Dow Chemical Co. - White-230 | 2.20 | 420 | |
| Polystyrene Cosden Oil and Chemical Co. - Impact 825D pellets | 2.0-3.0 | 370 | Good |
| 2. ABS - Marbon Division of Borg-Warner Corp. GSE 2502 | 0.50 | 780 | |
| Polystyrene Cosden Oil and Chemical Co. - Impact 825D pellets | 2.0-3.0 | 370 | Poor |

Additionally, in order to form a firm bond between each of the adjoining layers of polystyrene and normally incompatible ABS polymers, the intermediate layer ABS polymer must possess an inherent bonding compatibility with each of these polymers.

This ability to bond to both the polystyrene or solid hydrocarbon polymer and the normally incompatible ABS polymer is a further property of the intermediate layer ABS polymer separate from the melt index criteria discussed above, although not completely independent. Two different ABS polymers may exhibit the melt index characteristics necessary for use as the polymer of the co-extruded intermediate layer, and yet one of the ABS polymers may bond very strongly with the polystyrene and incompatible ABS polymer, whereas the other ABS polymer will produce little or no bond with the polystyrene and/or incompatible ABS polymer.

Insofar as the question of what constitutes a sufficient peel strength is concerned, it should be noted that this is a somewhat relative standard, as a peel strength sufficient for one purpose may not suffice for other purposes. For example, peel strength is not such an important criterion where the respective layers are each relatively thick, i.e., 10 mils or more, since there is less tendency for one of the layers to be peeled off of the other. This is particularly true where the multiple-layered composite is thermoformed subsequent to formation because the resultant deformations in the article provide a certain degree of interlocking between individual layers. On the other hand, the problem of bond strength becomes of paramount importance when one or more layers, especially those at the surface, are very thin. Any manipulation or abuse of such a multiple-layered product causes stress in the thin layers which can result in localized or total delamination. It must also be appreciated that certain specific utilities demand a higher peel strength than other utilities.

For the purposes of the instant invention, suitable peel strengths between intermediate layer ABS polymers and the adjoining layers of polystyrene and incompatible ABS polymer is considered to be a strength of at least about 1 lb./inch. The most useful products are those exhibiting a bond of at least about 3 lbs./inch, and superior products are those having a bond of between 7 and 10 lbs/inch or more. It is difficult to measure values above 10 lbs./inch since the layers become practically inseparable.

Applicants have found that ABS polymers having a bonding factor with the polystyrene or solid hydrocarbon polymer ($BF_{C1}$) of between 0.9 and 1.15, wherein the bonding factor ($BF_{C1}$) is defined by:

$$BF_{C1} = \frac{A(15.4) + B(8.6) + S(9.1)}{\delta_1}$$

wherein A, B, and S are the respective weight percentages of acrylonitrile, butadiene and styrene of the intermediate layer ABS polymer, $\delta_1$ is the Hildebrand solubility parameter for the solid hydrocarbon or polystryene polymer, and A is less than about 0.4 S; and a bonding factor with the normally incompatible ABS polymer ($BF_{C2}$) of between 0.9 and 1.15, wherein the bonding factor ($BF_{C2}$) is defined by $$BF_{C2} = \frac{A_2(15.4) + B_2(8.6) + S_2(9.1)}{BF_{C1} \delta_1}$$

wherein $A_2$, $B_2$, and $S_2$ are the respective weight percentages of acrylonitrile, butadiene, and styrene of the normally incompatible ABS polymer, and $BF_{C1}$ and $\delta_1$ are defined as above, may be successfully utilized as the intermediate layer ABS polymer to provide multiple-layered products of polystyrene and incompatible ABS layers, which exhibit excellent peel strength. In order to achieve optimum peel strength, however, the bonding factor of the intermediate layer ABS polymer with each of the polymers of the adjoining layers is most preferably about 1, whereas suitable peel strengths may be achieved with a bonding factor ranging between about 0.9 and 1.15, or more preferably between about 0.95 and 1.1. Where additional polymerized components are present in an ABS composition, the above definitions can be modified to more accurately characterize the polymer, e.g., where a small amount of methylmethacrylate is present, the additional component of MMA (9.5) may be included in the above definition; however, the amount of any such additional component is usually so small as to be negligible in the formula given above.

Furthermore, ABS polymers suitable for use as the intermediate layer polymer are those characterized by a ratio of weight percent acrylonitrile to weight percent styrene of less than about 0.4, preferably less than about 0.3, and ideally less than about 0.215. In other words, A should be less than 0.25 in the definition of the bonding factor $BF_{C1}$. Typically, ABS polymers satisfying these requirements will contain an acrylonitrile content of less than about 25%.

Where the polystyrene and incompatible ABS polymers are so diverse that it is difficult to select an ABS polymer for use as the intermediate layer which has a bonding factor with each adjoining polymer within the above specified ranges, the instant invention also contemplates the use of additional intermediate ABS polymer layers to enable the bonding of the polystyrene and incompatible ABS polymer. In this embodiment, a second intermediate layer ABS polymer is co-extruded between the first intermediate layer and the layer of incompatible ABS polymer to enable bonding.

The ABS polymer for the second intermediate layer will be selected to possess bonding factors between each adjoining layer within the ranges specified above, wherein the bonding factor with the first intermediate layer ($BF_{C2}$) is defined by the equation:

$$BF_{C3} = \frac{A_3(15.4) + B_3(8.6) + S_3(9.1)}{BF_{C1} \delta_1}$$

wherein $A_3$, $B_3$, and $S_3$ respectively designate the percentage of acrylonitrile, butadiene, and styrene in the ABS polymer of the second intermediate layer, and wherein the bonding factor between the ABS polymer of the second intermediate layer and the adjoining layer of incompatible ABS polymer is defined by:

$$BF_{C4} = \frac{A_4(15.4) + B_4(8.6) + S_4(9.1)}{BF_{C3} \times BF_{C1} \times \delta_1}$$

wherein $A_4$, $B_4$, and $S_4$ respectively designate the percentage of acrylonitrile, butadiene, and styrene in the normally incompatible ABS polymer, and $BF_{C3}$, $BF_{C1}$, and $\delta_1$ are as defined above.

If necessary, the present invention also contemplates that additional intermediate layers of ABS polymer having bonding factors between each of the polymers of the adjoining layers within the specified ranges, and defined in like manner, may also be utilized.

Any ABS polymer which satisfies the foregoing requirements of melt viscosity, bonding factors, and ratio of weight percent acrylonitrile to weight percent styrene is suitable for use as the intermediate layer, or layers, of the co-extruded composites of the instant invention. Moreover, the present invention contemplates that the ABS resin of the intermediate layer may be not only homogeneous ABS polymers which satisfy the foregoing requirements, but also physical blends of two or more ABS polymers which satisfy the above criteria. From the published physical data, such as molecular weight, chemical composition, melt index, and/or melt viscosity readily available for commercially marketed ABS resins, the skilled artisan will be able to ascertain with certainty which ABS polymers may be utilized to strongly adhere together a particular polystyrene polymer with a particular ABS polymer normally incompatible therewith. Accordingly, the present invention provides a method by which co-extruded composites between normally incompatible polymers, having excellent peel strength, may be manufactured with predictability and certainty.

The principles of the instant invention are generally applicable to the manufacture of either multiple-layered polymeric "film" (less than 10 mils in thickness) or "sheeting" (10 mils or thicker). Thus, broadly speaking, it is possible to produce a composite film having a 1 mil or thinner surface layer of ABS on a 1 mil or thinner surface layer of a different ABS polymer on a 4 or 5 mil or even a 1 mil base layer of polystyrene. However, the products of most interest to the instant invention are multiple-layered sheets of from 10 mils up to ⅜ inch in thickness. Each of the polymer layers can be of any desired thickness. Typically, the intermediate layer will have a thickness of less than about 5 mils and will preferably have a thickness of 1 or 2 mils or less. The incompatible ABS layer will have a thickness ranging from a fraction, e.g., ¼ or ½ mil to as much as 20 or 30 mils or thicker. Additionally, the polystyrene layer may have a thickness ranging from about 1 mil to as much as 80% of the thickness of the co-extruded composite.

The composite co-extruded plastic sheeting or film of the instant invention may be prepared by any of the co-extrusion methods well known to those skilled in the art. For example, a sheet of each polymer may be extruded and then pressed while in a heat-softened condition into a unitary composite structure. Alternatively, a composite stream of molten polymer may be formed, having a central area of the intermediate layer ABS polymer with polystyrene on one side thereof and the incompatible ABS polymer on the other side thereof. This composite stream is then fed to an extrusion die wherein the composite stream is laterally expanded into the composite sheeting or film. This latter method of co-extrusion is the preferred method of the instant invention and is fully described in U.S. Pat. No. 3,833,704, herein incorporated by reference. In order to produce a co-extruded composite product having the desired layer thicknesses, the feed rates in each of the feed lines of the co-extrusion apparatus of the aforementioned patent may be controlled, relative to each other, as would be obvious to those skilled in the art.

Suitable process conditions during the co-extrusion procedure include an extrusion temperature for the polystyrene polymer of from about 400° F. To about 550° F., an extrusion temperature for each of the ABS polymers of from about 430° F. to about 550° F., an extrusion die temperature of from about 400° F. to 550° F., and preferably about 500° F. ±25° F., an extrusion pressure of from about 750 to about 3,000 psi for the polystyrene stream and similarly from between about 2,500 to about 4,500 psi for each of the ABS streams. It is to be noted, of course, that the downstream pressure at the point where the three streams intersect is equal. Additionally, best results are also obtained when the cooler rolling assembly is maintained with a top roll temperature within the range of about 140° to 175° F., and with a top roll pressure approximately sufficient to overcome upward spring tension on the rollers.

As has been aforementioned, the present invention also provides in a second embodiment a co-extruded plastic sheeting which is ideally suited for use in the manufacture of plastic containers. Due to the desirable physical properties of acrylonitrile-containing polymers, such as ABS, the use of these polymeric materials in plastic containers intended for food and beverages has been very attractive. Utilizing the inventive concepts of the instant invention, applicants have developed a co-extruded composite material which is ideally suited for use in the manufacture of plastic containers.

When utilized in plastic containers, the above-described plastic sheeting will typically have an outer layer thickness of from about 0.02 to 0.03 inches, an intermediate layer thickness of about 0.001 to about 0.005 inches, and a thickness of the polystyrene or solid hydrocarbon base layer of from about 0.001 to 0.01 inch.

For the manufacture of plastic containers from the co-extruded plastic sheeting of the instant invention, the formed sheeting is passed through a conventional thermoforming apparatus in which the sheeting is impressed with a large number of shapes corresponding to the containers to be produced. Thereafter, the shaped sheeting passes into a trim press in which the individual containers are separated from the sheeting. Optionally, the containers may be processed in a conventional curling machine to be provided with a curled lip suitable for receiving a separately prepared cover in a snap-fit relation for sealed storage.

In order to more fully describe the present invention, the following examples are presented which are intended to be merely illustrative and not in any sense limitative of the instant invention.

Two samples of co-extruded composite sheeting according to the instant invention were prepared using as the base layer impact polystyrene (Cosden Oil & Chemical Co., 825 E. Pellets) comprising 94% by weight styrene and 6% butadiene. In the first sample, the intermediate layer ABS polymer comprised 14.2 weight percent acrylonitrile and 82.1 weight percent styrene, and was obtained from the Dow Chemical Co. under the trade designation white-230. For the outer ABS layer, a Dow Chemical Co. ABS polymer containing 22.7 weight percent acrylonitrile and 69.3 weight percent styrene (available under the trade designation Dow-350) was utilized. In the second sample, an ABS polymer containing 14.6% acrylonitrile and 70.5 weight percent styrene (obtained from the Dow Chemical Co. under the trade designation Dow 213) was utilized. The outer ABS layer comprised Monsanto 2318, an ABS polymer containing 20.4% acrylonitrile and 68.9% styrene. After manufacture, each of these representative samples of co-extruded composite sheeting were tested for peel strength, and were found to exhibit excellent bond strenghts between each layer.

It is thus seen from these examples, that by utilizing an intermediate layer of an ABS polymer having a bonding factor and a melt viscosity which renders it strongly adherable to the polymer of each adjoining layer, highly incompatible polymers may be laminated with excellent results. Accordingly, the present invention thus provides composite plastic sheeting and films which successfully combine the desirable properties of incompatible polymers, while simultaneously providing co-extruded composites of incompatible polymers which exhibit excellent peel strength.

While the invention has been described in terms of various preferred embodiments and illustrated by numerous examples, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A co-extruded plastic composite comprising:
    (a) a base layer of a styrene polymer selected from the group consisting of homopolystryene, impact polystyrene, and normal copolymers of styrene containing a minor amount of another copolymerizable monomer;
    (b) an outer layer of an ABS polymer normally incompatible with said styrene polymer; and
    (c) an intermediate layer of a second ABS polymer disposed between said styrene polymer base layer and said ABS polymer outer layer, having a bonding factor with said styrene polymer ($BF_{CI}$) of between 0.9 and 1.15 wherein said bonding factor is defined by $$BF_{CI} = \frac{A(15.4) + B(8.6) + S(9.1)}{\delta_1}$$

Wherein A, B, and S are the respective weight percentages of acrylonitrile, butadiene, and styrene in said second ABS polymer, $\delta_1$ is the Hildebrand solubility parameter for said styrene polymer, and A is less than about 0.4 S, and having a bonding factor with said normally incompatible ABS polymer ($BF_{C2}$) of between 0.9 and 1.15 wherein said bonding factor $BF_{C2}$ is defined by $$BF_{C2} = \frac{A_2(15.4) + B_2(8.6) + S_2(9.1)}{BF_{C1} \delta_1}$$

Wherein $A_2$, $B_2$, and $S_2$ are the respective weight percentages of acrylonitrile, butadiene, and styrene in said normally incompatible ABS polymer, and $BF_{C1}$ and $\delta_1$ are as defined above, and having further a melt viscosity under extrusion conditions between about 50 to 150% of the melt viscosities of each of said styrene polymer and said normally incompatible ABS polymer.

2. The plastic sheeting of claim 1, wherein said styrene polymer is homopolystyrene.

3. The plastic sheeting of claim 1, wherein said styrene polymer is impact polystyrene.

4. The plastic sheeting of claim 1, wherein said sheeting has a thickness of from about 10 mils to ⅜ inches.

5. The plastic sheeting of claim 1, wherein $BF_{C1}$ and $BF_{C2}$ are between 0.95 and 1.1.

6. The plastic sheeting of claim 1, wherein $BF_{C1}$ and $BF_{C2}$ are approximately 1.

7. The plastic sheeting of claim 1, wherein A is less than about 0.3 S.

8. The plastic sheeting of claim 1, wherein A is less than about 0.25 S.

9. A process for the manufacture of a co-extruded laminated plastic sheet from a styrene polymer and ABS polymer normally incompatible therewith, comprising co-extruding said polystyrene polymer and said normally incompatible ABS polymer in an extrusion die with an intermediate layer therebetween of an ABS polymer having a bonding factor with said styrene polymer ($BF_{C1}$) of between about 0.9 and 1.15 wherein said bonding factor $BF_{C1}$ is defined by $$BF_{C1} = \frac{A(15.4) + B(8.6) + S(9.1)}{\delta_1}$$

wherein A, B, and S are the respective weight percentages of acrylonitrile, butadiene, and styrene in said intermediate layer ABS polymer, $\delta_1$ is the Hildebrand solubility parameter for said styrene polymer, and A is less than about 0.4 S, a bonding factor with said normally incompatible ABS polymer ($BF_{C2}$) of between 0.9 and 1.15 wherein said bonding factor $BF_{C2}$ is defined by:

$$BF_{C2} = \frac{A_2(15.4) + B_2(8.6) + S_2(9.1)}{BF_{C1} \delta_1}$$

wherein $A_2$, $B_2$, and $S_2$ are the respective weight percentages of acrylonitrile, butadiene, and styrene in said normally incompatible ABS polymer, and $BF_{C1}$ and $\delta_1$ are as defined above, and having further a melt viscosity under extrusion conditions of between about 50 to 150 percent of the melt viscosities of each of said styrene polymer and said normally incompatible ABS polymer.

10. The process of claim 9, wherein $BF_{C1}$ and $BF_{C2}$ are between 0.95 and 1.1.

11. The process of claim 9, wherein $BF_{C1}$ and $BF_{C2}$ are approximately 1.

12. The process of claim 9, wherein A is less than about 0.3 S.

13. The process of claim 9, wherein A is less than about 0.25 S.

14. The process of claim 9, wherein said ABS polymers are extruded at a temperature of from about 430° F. to about 550° F., and the styrene polymer is extruded at a temperature of from about 400° F. to about 500° F.

15. The process of claim 9, wherein said extrusion die is maintained at a temperature of from about 400° F. to about 550° F.

* * * * *